United States Patent [19]
Hanno

[11] Patent Number: 6,009,609
[45] Date of Patent: Jan. 4, 2000

[54] DRIVE LINE CONVERSION PROCESS

[75] Inventor: Barry L. Hanno, Clackamas, Oreg.

[73] Assignee: Warn Industries, Inc., Milwaukie, Oreg.

[21] Appl. No.: 09/031,292

[22] Filed: Feb. 26, 1998

[51] Int. Cl.[7] .................................................. B21K 21/16
[52] U.S. Cl. ........................ 29/401.1; 464/154; 464/158; 403/359.5
[58] Field of Search ................................ 29/401.1, 893.2; 403/359.1–359.6, 6; 464/154, 158

[56] References Cited

U.S. PATENT DOCUMENTS

| | | |
|---|---|---|
| 2,430,683 | 11/1947 | O'Malley . |
| 2,907,188 | 10/1959 | Schmitter . |
| 2,918,809 | 12/1959 | Miller . |
| 3,588,154 | 6/1971 | Voight . |
| 3,871,786 | 3/1975 | Rennerfelt . |
| 4,037,429 | 7/1977 | Britzius . |
| 4,124,318 | 11/1978 | Sagady . |
| 4,128,022 | 12/1978 | Ritter . |
| 4,259,045 | 3/1981 | Teruyama . |
| 4,304,501 | 12/1981 | Gordon et al. . |
| 4,437,782 | 3/1984 | Geisthoff . |
| 4,514,108 | 4/1985 | Sagady . |
| 4,598,677 | 7/1986 | Mongin et al. . |
| 4,913,681 | 4/1990 | Green ..................................... 464/154 |
| 5,098,343 | 3/1992 | Tysver et al. . |
| 5,105,517 | 4/1992 | Barnow . |
| 5,186,573 | 2/1993 | Flotow . |
| 5,582,489 | 12/1996 | Marzio et al. . |
| 5,665,001 | 9/1997 | Jacob et al. . |
| 5,688,067 | 11/1997 | Straub . |

*Primary Examiner*—David P. Bryant
*Attorney, Agent, or Firm*—Robert L. Harrington

[57] ABSTRACT

A drive line conversion process that utilizes the same drive and driven components for a full time all-wheel drive as a selectable two-wheel/four-wheel drive. A coupler or clutch ring which connects a drive member to a driven member is retained in position to maintain full time engagement with the drive and driven member. A retainer is provided to secure the clutch ring in full time engagement with both the drive and driven member. This reduces engineering and production costs by using the same drive train for both drive applications.

2 Claims, 2 Drawing Sheets

DRIVE LINE CONVERSION PROCESS

FIELD OF THE INVENTION

This invention relates to a vehicle drive line and more particulary to the conversion of the drive line from two-wheel/four-wheel optional drive to fixed four-wheel drive.

BACKGROUND OF THE INVENTION

Over the years there has been developed a range of drive line capabilities. For example, there is two-wheel drive only, full-time four-wheel drive and two-wheel/four-wheel optional drive, i.e., the driver can elect as desired either two-wheel drive or four-wheel drive. The latter type of drive is somewhat more expensive because it requires the drive line components for driving all four wheels and also requires the disconnect mechanism typically at both the transmission and wheel end for disconnecting the non-functional drive line components when converted to two-wheel drive.

The same vehicle design may be desired for both two-wheel/four-wheel optional drive and full-time four-wheel drive. There are cost savings that can be realized in the design of the full-time four-wheel drive system over that of the two-wheel/four-wheel optional drive, i.e., the disconnect mechanism can be eliminated. Thus, there are fewer parts to produce and install resulting in savings of parts production costs and installation costs.

Ideally the drive and driven shafts required for converting between two-wheel and four-wheel drive are replaced with a single shaft. The clutch ring and actuator are eliminated and of course the need to assemble these components is also eliminated. Offsetting these advantages however is the need to design, produce and test a new drive line system which can be a major expense.

Accordingly, it is an object of the present invention to enable the use of the same drive line design for the same vehicle whether for full-time four-wheel drive or four-wheel/two-wheel optional drive while substantially reducing the cost of the drive line of the full-time four-wheel drive option, i.e., to a point close to the level of the cost of using a one-piece axle.

SUMMARY OF THE INVENTION

As contemplated herein for the preferred embodiment, the design of a two-wheel/four-wheel optional drive utilizes drive and driven shaft portions having mated spline ends positioned in end-to-end relation. An internally splined clutch ring is slidably mounted on the spline ends of the shaft portions and is movable between a first position in engagement with one of the shaft portions and a second position overlapping and thus in engagement with both of the splined ends to interlock the shaft portions.

The clutch ring is further designed to receive a fork connected to an actuator whereby movement of the fork back and forth produced by the actuator results in movement of the clutch ring between the first and second positions of engagement.

Conversion of the two-wheel/four-wheel optional drive to full-time four-wheel only drive is accomplished by retaining the two shaft portions and modifying the clutch ring to the extent that the clutch ring can be simplified without concern for the actuator fork. The previous shaft portion to which the clutch ring was permanently splined is also modified but only to the extent that the position of the clutch ring on the spline end in the second or overlapping position is determined and a groove is formed immediately behind the clutch ring. The actuator fork and control for controlling actuation of the actuator is eliminated and a spring clip is added to fit in the groove.

The number of components are reduced as indicated and pre-assembly involves placement of the spring clip in the groove of the said shaft portion and placement of the clutch ring on the shaft portion in abutment with the spring clip. The shaft portion with clutch ring is assembled into the drive line and then the remaining shaft portion is inserted into the clutch ring (which protrudes past the end of the first shaft portion). The structure of the coupled shaft portion may be slightly more costly to produce than a single shaft, and assembly of the coupled shaft portion into the drive line may be slightly more costly than is assembly of a unitary shaft. However, such is substantially less expensive than is the structure and assembly of the two-wheel/four-wheel optional drive and the use of the same basic components which has already been tested for structural qualifications enables avoidance of the substantial cost that would otherwise be incurred for design and testing of the unitary shaft assembly.

The invention is a simplification step that is not readily recognized without having a full appreciation of all the factors of component production costs, assembly costs and design and testing costs. Those skilled in the art, upon a review of the disclosure herein, will readily appreciate the simple but significant advantages provided by this invention.

DESCRIPTION OF THE INVENTION

Figure 1A:
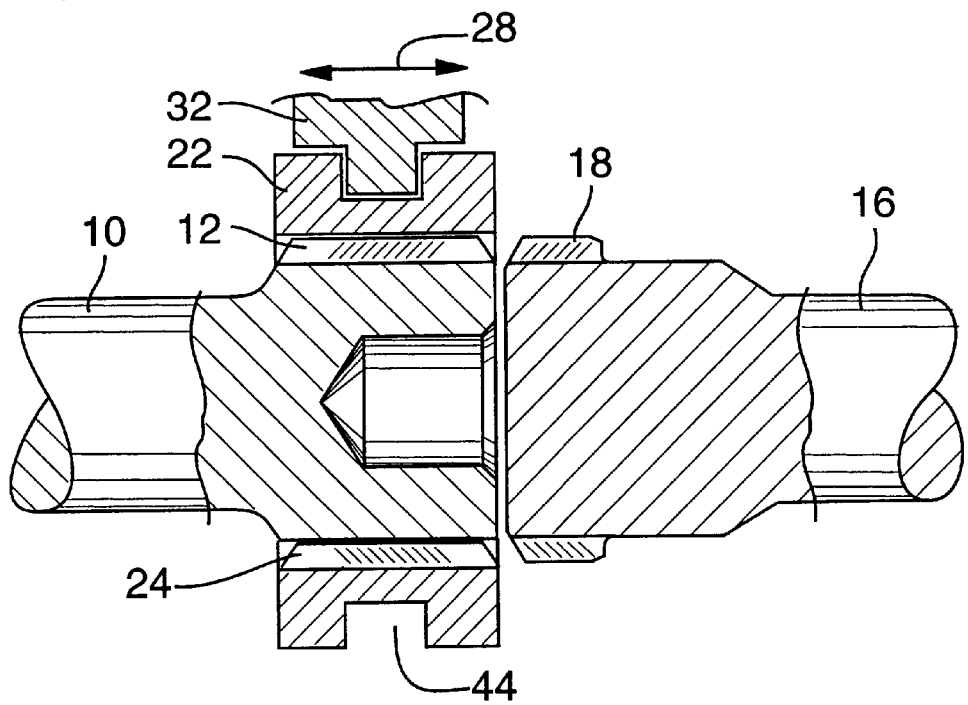
FIGS. 1A and 1B are views of a drive member and a driven member with a clutch ring of the prior art showing the disengaged and engaged positions, respectively.
Figure 1B:
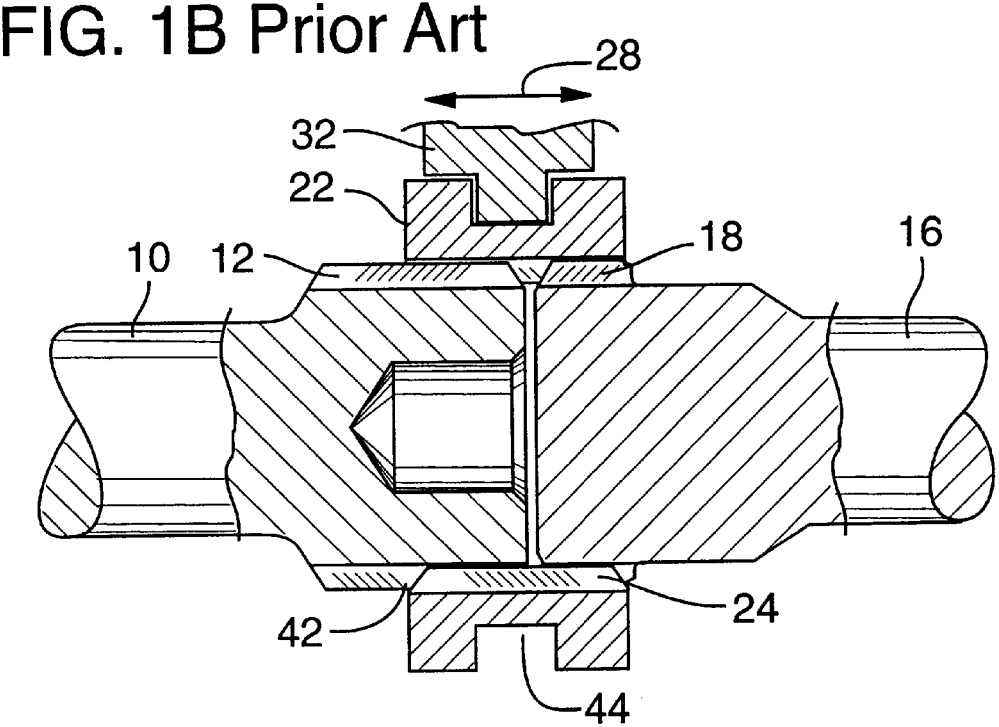

FIGS. 1A and 1B schematically illustrate components of a drive line of a vehicle that has a drive member 10 connectable and disconnnectable to and from a driven member 16 by a clutch ring 22. The clutch ring 22 has internal teeth 24 that mesh with the external teeth 12 of the drive member 10 and the external teeth 18 of the driven member 16. The clutch ring 22 is axially movable to be engaged with only one of the drive member 10 and driven member 16 or to be engaged with both the drive member 10 and the driven member 16. In the example given, the clutch ring 22 is engaged full time with the drive member 10 and is movable to engage the driven member 16.

A known shift mechanism 32 is provided to move the clutch ring 22 axially relative to the drive member 10 and the driven member 16. The shift mechanism 32 may be of the manual type where an operator will rotate a dial on the wheel hub to select either two wheel drive or four wheel drive. There are also powered shift mechanisms that may be operated remotely by the operator. One type of powered shift mechanism obtains its power from a vacuum source.

The clutch ring 22 is movable by the shift mechanism 32 in one direction to be engaged with only the drive member 10 and is movable in the opposite direction (as indicated by arrow 28) to be engaged with both the drive member 10 and the driven member 16. This is a typical arrangement for a vehicle that is shiftable between two-wheel drive and four-wheel drive. In this example the drive member 10 is rotatably driven by the engine of the vehicle. The driven member 16 is part of and is connected to a drive wheel of the vehicle. When it is desired to operate the vehicle in two-wheel drive the clutch ring 22 is moved axially by the shift mechanism 32 so that it is only engaged with the drive member 10. In this situation, the driven member 16 is not rotatably driven by the drive member 10 and the wheel coupled to the driven member 16 does not receive rotative power from the engine of the vehicle. When it is desired to operate the vehicle in four-wheel drive, the clutch ring 22 is moved axially by the shift mechanism 32 so that the clutch ring 22 engages both the drive member 10 and the driven member 16. The drive member 10 will then transmit rotative power from the engine to the driven member 16. An operator is thus able to select either two-wheel drive or four-wheel drive.

Vehicles are now produced with varied drive trains. They may be arranged for two-wheel drive only and with an arrangement for either two-wheel drive or four-wheel drive selected by the user when needed. Other vehicles are produced with full time four-wheel drive. The vehicle with full time four-wheel drive does not require an arrangement to selectively couple a drive member to a driven member as with the selectable two-wheel/four-wheel drives. Rather than replace the drive components with a singular drive member, the present invention utilizes the drive member 10 and the driven member 16 that are coupled permanently together by a clutch ring 22.

Figure 2:
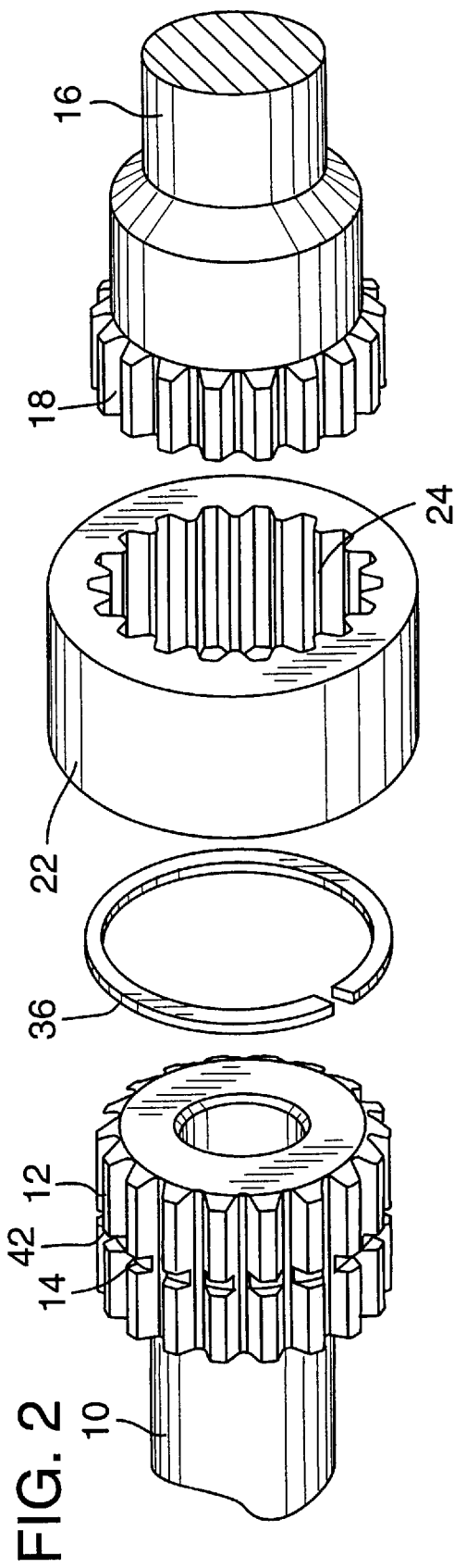
FIG. 2 is an exploded view in perspective of a drive member, a driven member, a clutch ring and a retainer for conversion of the FIG. 1 device in accordance with the present invention.
Figure 3:
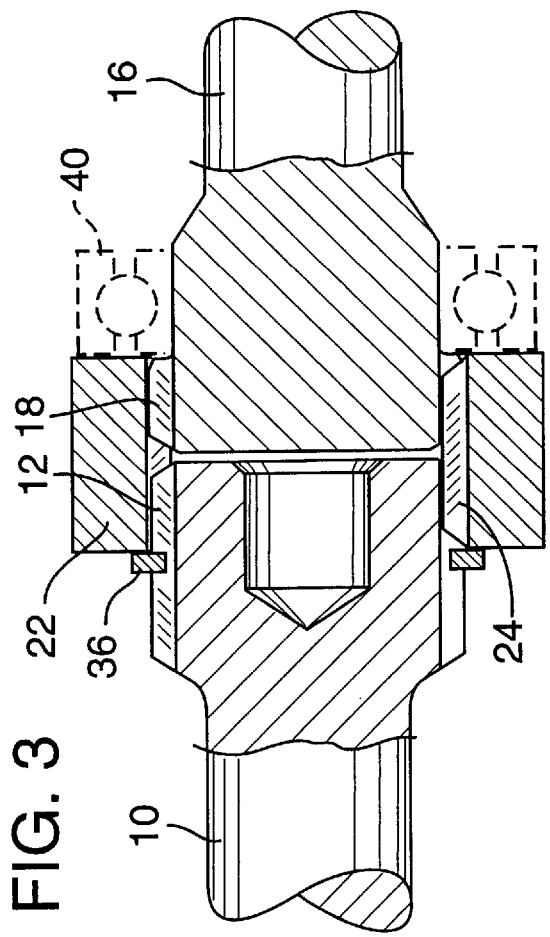
FIG. 3 is an assembled view of the drive line components of FIG. 2.

FIGS. 2 and 3 illustrate a drive member 10, a driven member 16, a clutch ring 22 and a retainer 36. The drive member 10 has a groove 14 formed in the teeth 12 to receive the retainer 36. The retainer 36 is fitted in the groove 14 of the drive member 10. The retainer 36 prevents the clutch ring 22 from being moved axially to dis-engage from the driven member 16. The drive member 10 and the driven member 16 are thus permanently coupled together by the clutch ring 22. In this embodiment, a bearing 40 which rotatably supports the driven member 16 prevents the clutch ring 22 from moving axially away from the drive member 10. It will be appreciated that other retention devices, such as a spring may be utilized to maintain the clutch ring 22 against the retainer 36.

The shift mechanism 32 is not required in the vehicle with full time all wheel drive and is therefore not provided. Essentially the same drive train is utilized for the full time all-wheel drive as is utilized for the selectable two-wheel/four-wheel drive arrangement. This reduces costs by not having to provide a separately designed drive train. The conversion process is explained below:

With reference to FIG. 1B, the point 42 is determined, i.e., that point on teeth 12 immediately rearward of the clutch ring 22 with the clutch ring 22 in full engagement with the teeth 18 of driven member 16. The groove 14 is formed at position 42 as viewed in FIG. 2. The snap ring 36 is designed to fit the groove 14 and is placed into the groove as viewed in FIG. 3. The clutch ring 22 is modified (simplified) by eliminating the saddle configuration 44 (FIG. 1B) which receives shift member 32. Clutch ring 22 is then assembled onto the teeth 12 and in a typical arrangement is shipped to the vehicle manufacturer in this pre-assembled state. The vehicle manufacturer assembles the pre-assembled components as just described into the vehicle chassis and inserts the drive member 16 (teeth 18 engaged with teeth 24 in the clutch ring) as illustrated in FIG. 3 and including associated components, e.g., a bearing 40 or similar retention member, for securing the clutch ring in place.

Those skilled in the art will recognize that modifications and variations may be made without departing from the true spirit and scope of the invention. The invention is therefore not to be limited to the embodiments described and illustrated but is to be determined from the appended claims.

I claim:

1. A process for converting a vehicle drive line system which comprises:

(a) providing an arrangement of components for a two-wheel/four-wheel optional drive system including a drive shaft and a driven shaft in mated end-to-end relation, splines provided on a peripheral end portion of each of the mated ends, a clutch ring slidably mounted on the splines of one of the shafts and slidably engageable with the splines of the other of the shafts, and an actuator selectively positioning the clutch ring on to and off of the splines of the other of the shafts for connecting and disconnecting the drive and driven shafts;

(b) utilizing selected ones of the components of the drive system of step (a) for a four-wheel only drive system including:

(1) determining the position of the clutch ring on the splines of said one of the shafts with the clutch ring positioned also on the splines of the other of the shafts, the drive and driven shafts thereby connected;

(2) providing a circular groove on the splines of said one of the shafts adjacent to the clutch ring in the determined position;

(3) placing a spring clip in the groove for locking the clutch ring in the connected position.

2. The conversion process of claim 1 including retaining the clutch ring in the determined position by positioning a retention structure on said other shaft adjacent the clutch ring and in cooperative relation with the spring clip.

* * * * *